Patented Mar. 10, 1953

2,631,117

UNITED STATES PATENT OFFICE 2,631,117

BATTERY ADDITIVE PRODUCT AND PROCESS FOR MAKING THE SAME

Ray B. Hanchey, Dallas, Tex.

No Drawing. Application January 2, 1952, Serial No. 264,680

10 Claims. (Cl. 136—154)

This invention relates to a product for addition to an electrolyte solution for lead type wet cell batteries for automotive vehicles, and the like, and a process for making the same, and its principal object resides in the provision of an additive having characteristics which will improve the performance of a battery and tend to prolong its usefulness by affording protection for its plates by maintaining the free lead sulphate, which is released by the acid solution, in a suspended state and prevent its precipitation on the surface and in the pores of the plates resulting in an encrustation reducing the surface area of the plates.

Another object of the invention resides in the provision of a novel process of making the product from a mineral material containing properties which react to actively support or maintain the freed portions of the lead sulphate, which would ordinarily form sedimentation in the bottom of the battery, and suspend the material in a colloidal state in the electrolyte.

A still further object of the invention is that of providing a simplified process by which the additive material can be economically produced and prepared for packaging and use, either in a liquid or dried state.

Broadly, it is an object of the invention to provide a highly effective additive for an electrolyte solution by which wet cell batteries can be caused to function efficiently over much longer periods than is possible under ordinary conditions and by conventional treatment which does not generally include the addition of elements calculated to improve the function of a battery or prolong its usefulness.

It is conventional practice to construct the standard type of automotive electric storage batteries with a plurality of cells, each having a series of plates or grids supported vertically therein so that all of the positive plates or grids are connected together and all of the negative plates, which are interposed between the positive plates, are also united, and between the plates and keeping them apart are separators which may be of wood, rubber, glass, or other suitable materials. The entire assembly is contained within a box or casing.

Each of the negative plates are generally formed of a lead antimony alloy and covered with a paste consisting of oxide of lead or litharge (PbO) made by mixing the product with dilute sulphuric acid. The positive plates, which are similarly formed but generally heavier in structure, are pasted with a putty-like compound comprising red lead ($Pb_2O_4$) mixed with a weak solution of sulphuric acid or ammonium sulphate solution which is converted into lead peroxide.

The electrolyte, in which the plates are immersed, comprises an aqueous solution of sulphuric acid of about 20 to 40 per cent strength and acts upon the plates to produce metallic lead and peroxide of lead which, as previously stated, is gradually precipitated to the bottom of the cells until it reaches sufficient proportions to form a connection between the plates and a resultant short circuit which rapidly impairs or destroys the function of the battery.

The mineral product or additive here under consideration must be free of any conductive metals which would be injurious to the battery but capable of a chemical action of a quality which will tend to dissolve the lead sulphate and form a colloidal suspension of the portion thereof which fails to dissolve, thus aiding in preventing an encrustation from forming on the plates to decrease their effective areas. Such action of the additive product will aid in keeping the plates open so that the necessary chemical action of the battery can be efficiently maintained and maximum performance insured.

The additive product is obtained through a process, which will be presently described in detail, from an ore, or igneous rock or shale which abounds in the State of Utah, U. S. A., near Salt Lake City, and which is identified as an aluminosilicate or silicide, and whose typical composition or spectrographic analysis in percentages, is generally as follows:

| | |
|---|---|
| Silicon | 25.0 |
| Aluminum | 15.0 |
| Magnesium | 2.0 |
| Chromium | 0.02 |
| Vanadium | 0.03 |
| Calcium | 0.20 |
| Sodium | 1.50 |
| Titanium | 2.0 |
| Zirconium | 0.30 |
| Potassium | 1.0 |
| Iron | 2.0 |
| Lead | Trace |
| Tin | do. |
| Silver | do. |
| Strontium | do. |
| Nickel | do. |
| Copper | do. |
| Manganese | do. |

Examples of the process by which the product is produced are as follows:

Example A

The raw mineral or ore is first pulverized to a relative fineness by grinding, as through a hammermill, and the pulverized material is then mixed with a mineral acid, such as sulphuric acid of a strength incapable of charring the organic materials which are present in the mineral product, but of sufficient strength to digest or dissolve the structural materials thereof to facilitate extraction of the occluded soluble portions. This acid extraction is carried out at approximately 112° F.

The resultant mixture is filtered hot with the aid of commercial filtering products and a vacuum, or settled and filtered, as desired. A continuous process of extraction or pressure filtration, with or without the use of a vacuum method, may be employed to expedite quantity production.

The next step in the process is to alkalize the filtrate with an hydroxide, such as sodium hydroxide or ammonium hydroxide, to precipitate the ions in the mineral which form the insoluble hydroxides, such as aluminum, iron hydroxides. These hydroxides are separated from the solution by decantation and filtration. The filtrate is then acidified to convert all of the dissolved organic salts therein to their free acids.

It is desirable to reduce the solution thus obtained to a concentrated form to facilitate packaging and storage. This can be accomplished by evaporation to the desired concentration at which the product is to be added to the electrolyte, or it may be dehydrated and powdered.

Example B

Another example of the process consists in treating the pulverized mineral with a strong mineral acid, as by mixing or washing the pulverized mineral with the acid, of a strength sufficient to convert the organic salts, naturally occurring in the mineral, to their acid state, and such acids formed thereby will include succinic acid and may include several related compounds. Succinic acid can be extracted from the treated ore by dry distillation or sublimation, and can be used without further purification, or it can be added to the product, described in Example A, to increase the efficiency of that product.

It is obvious that certain changes and modifications may be resorted to from time to time, by persons skilled in the art, in carrying out the process herein described without departing from the spirit of the invention or the scope of the appended claims.

What is claimed is:

1. In a process for the production of an electrolyte additive for wet cell batteries from an alumino-silicate shale which consists in pulverizing the shale, mixing the pulverized product with hot sulfuric acid to facilitate extraction of occluded soluble portions thereof, filtering the mixture while hot, adding an hydroxide to the filtered product sufficient to alkalize the same and precipitate the ions forming insoluble hydroxides, separating the precipitate by filtration, acidifying the filtrate to convert dissolved salts to free acids, and concentrating the product.

2. In a process for producing an electrolyte additive for electric wet cell batteries which consists in pulverizing an alumino-silicate shale, mixing the pulverized shale with a mineral acid, such as sulfuric acid, of an amount sufficient to digest the structural materials of the pulverized product without charring the organic materials thereof and heating the mixture to a boiling point to extract the occluded soluble portions, filtering the heated products, adding an hydroxide to alkalize the product to precipitate the insoluble hydroxides and removing the precipitate by filtration, converting the dissolved organic salts to their free acids by acidifying the filtrated precipitate, and then concentrating or drying and pulverizing the resultant product.

3. In a process for making an electrolyte additive for electric wet cell batteries from a silicide, which consists of reducing the silicide to a relatively fine powder and mixing the powder with sulfuric acid and heating to extract the occluded soluble products of the pulverized silicide, filtering the heated mixture, alkalizing the filtrate with an hydroxide to precipitate the insoluble hydroxides, converting the dissolved organic salts in the filtrate to their free acids by acidification, and then concentrating the product.

4. In a process for making an additive for electrolyte for electric wet cell batteries, which consists in pulverizing a silicide ore, extracting the occluded soluble portions of said ore by the addition of sulfuric acid and heating, filtering the hot mixture, alkalizing the filterate with an hydroxide to precipitate the insoluble hydroxides, acidifying the filtrate to convert its dissolved organic salts to their free acids, and then drying and powdering the product.

5. In a process for making an electrolyte additive for electric wet cell batteries, which consists in pulverizing an alumino-silicate shale and acidifying and heating the same to extract succinic acid and other organic acids therefrom, filtering the hot mixture and alkalizing the filtrate with an hydroxide to precipitate the insoluble hydroxides, filtering out the precipitate, and concentrating the residual product.

6. The herein described process for producing an electrolyte additive for electric wet cell batteries, which consists in treating pulverized alumino-silicate ore by mixing therewith a mineral acid, such as sulfuric acid, and heating the mixture to extract the occluded soluble portions therefrom, filtering the heated mixture and alkalizing the filtrate by the addition of an hydroxide to precipitate the insoluble hydroxides, and then drying and powdering the residual product.

7. In a process for making an additive product for an electrolyte for electric wet cell batteries from an alumino-silicate bearing ore, which consists in first pulverizing the ore and mixing a mineral acid therewith having a characteristic capable of digesting the structural materials of the pulverized ore, heating the product to facilitate the extraction of the occluded soluble portions thereof, separating the liquid mixture from the solids by filteration or extraction to produce a colloidal solution, alkalizing the solution with an hydroxide to precipitate the insoluble hydroxides therefrom, converting the dissolved ortanic salts to their free acids by the addition of acids to the solution, and concentrating the product.

8. In a process for producing an electrolyte additive for electric storage batteries from an alumino-silicate ore, which consists of pulverizing the ore and adding a mineral acid, such as sulfuric acid, heating the mixture to approximately 112 degrees F. to facilitate solution of the occluded soluble portions, including succinic acid and other related compounds, filtering the hot mixture, and adding sodium hydroxide thereto to precipitate iron and aluminum from the product.

9. In a process for producing an electrolyte additive for electric storage batteries from a silicate ore, which consists in pulverizing the ore and mixing with water and adding to the mixture a mineral acid to extract the succinic and other organic acids from the product, heating the mixture to its boiling point to facilitate the extraction process, filtering the heated mixture and alkalizing the same with an hydroxide to precipitate the insoluble hydroxides formed in the mixture, and acidifying the mixture to convert the dissolved organic salts to their free acids.

10. In a process for producing an additive for electrolyte for electric storage batteries from an alumino-silicate ore, which consists in reducing the ore to finely divided particles, mixing the product with a strong mineral acid of sufficient quantity to convert the occluded soluble portions and other acid salts to their free acids, including succinic acid, heating the mixture to facilitate extraction of said soluble portions, filtering the heated mixture, and concentrating the filtrate.

RAY B. HANCHEY.

REFERENCES CITED

The following references are of record in the file of this patent:

UNITED STATES PATENTS

| Number | Name | Date |
|---|---|---|
| 1,429,830 | Banks | Sept. 19, 1922 |

FOREIGN PATENTS

| Number | Country | Date |
|---|---|---|
| 16,008 | Great Britain | Sept. 4, 1906 |